Patented Mar. 19, 1940

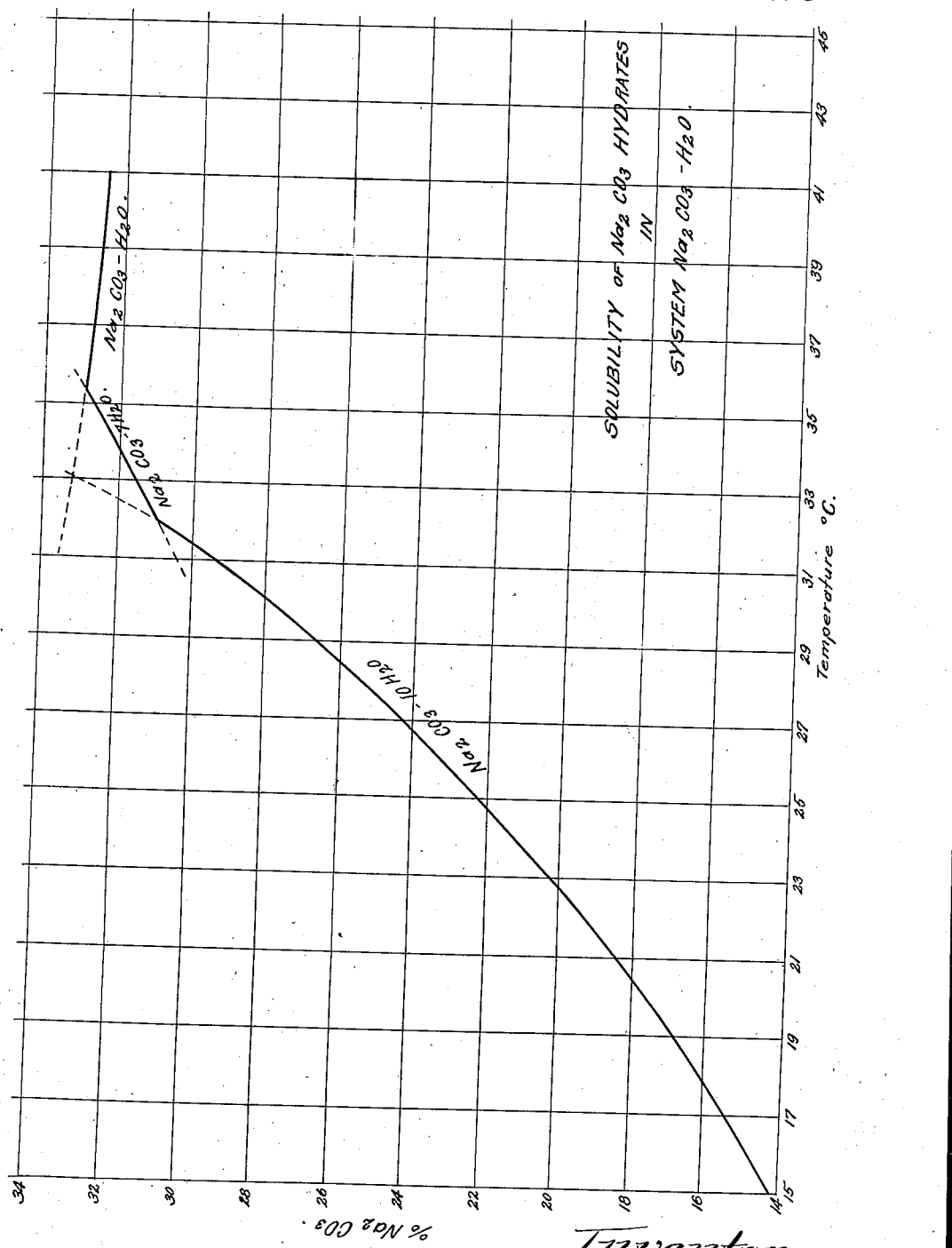

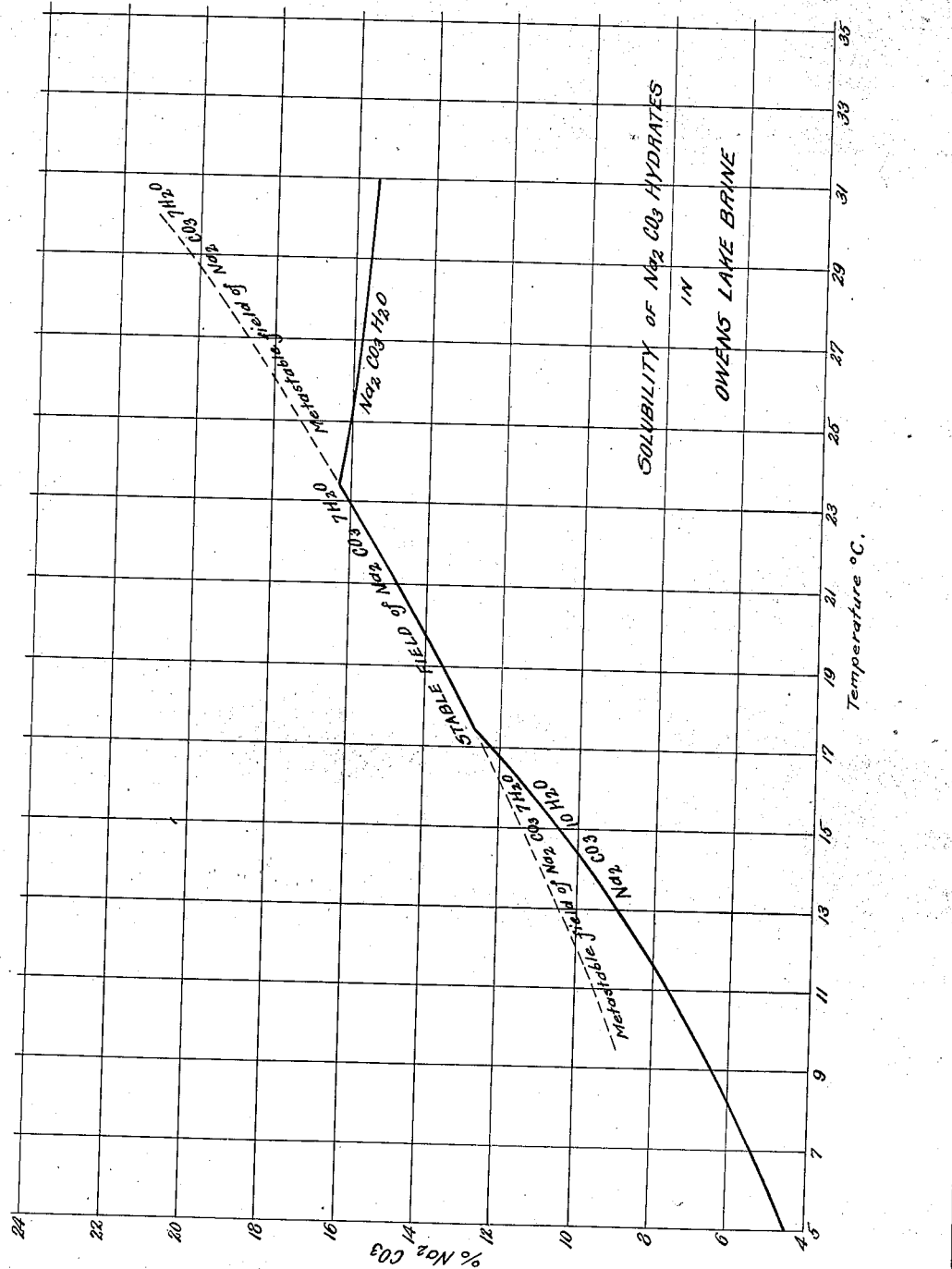

2,193,817

UNITED STATES PATENT OFFICE 2,193,817

PROCESS FOR RECOVERING SODIUM CARBONATE FROM BRINES

Alexis C. Houghton, Bartlett, Calif., assignor to Frederic A. Dakin, Boston, Mass., as trustee Application April 9, 1936, Serial No. 73,498

5 Claims. (Cl. 23—38)

This invention relates to an improved process of recovering commercially pure sodium carbonate from the brines of Owens Lake, California, and other similar brines containing sodium carbonate, sodium sulphate, and other constituents, by a crystallization method strictly according to the principles of physical chemistry. By commercially pure sodium carbonate is meant the soda ash of commerce containing 99 per cent or more of $Na_2CO_3$, equivalent to 58% $Na_2O$, on which basis the greater part of the soda ash manufactured is sold.

All the existing soda ash plants on Owens Lake recover sodium carbonate from these brines and alkaline deposits by the traditional method of carbonation. However, in U. S. Patents #1,759,361 and #1,853,275, issued to J. G. Miller and myself, we have described a crystallization process which seeks to avoid certain objections fully set forth therein which are inherent in the carbonation process, such crystallization process making a purer product at a cheaper cost than by carbonation. In these inventions sodium carbonate decahydrate containing a small amount of sodium sulphate decahydrate, is crystallized by refrigerating the brines under controlled conditions, and this produce is freed from the small amount of sodium sulphate by melting the decahydrate and evaporating off a portion of the water to crystallize out a pure sodium carbonate monohydrate free from sodium sulphate. The invention to be here described is much simpler than the inventions of the above named and other patents, as it crystallizes out a pure sodium carbonate from the brines direct in one crystallization instead of two. Also, with the exception of the drying operation, it operates throughout at temperatures not far removed from average room temperatures and readily obtainable with ordinary cooling water or very slight warming, obviating the necessity of any artificial refrigeration or of boiling solutions, making it extremely economical in thermal energy requirements for either heating or cooling.

Briefly the principle of this invention consists in crystallizing sodium carbonate directly from a brine saturated with sodium chloride and containing both sodium carbonate and a certain amount of sodium sulphate, under such conditions of concentration and temperature control that only pure sodium carbonate heptahydrate free from sodium sulphate will crystallize out in a commercial yield of from 50 to 70 per cent of the contained sodium carbonate of the brine, and then drying this sodium carbonate heptahydrate to the anhydrous state without further recrystallization through the monohydrate or any other form of sodium carbonate.

It is well known from various studies published in the chemical literature that when sodium carbonate is crystallized as the decahydrate from solutions containing both sodium carbonate and sodium sulphate, that "mixed crystals" or solid solutions of sodium sulphate decahydrate in sodium carbonate decahydrate are formed, the proportion of sodium sulphate in the decahydrate crystals depending on the ratio of sulphate to carbonate in the original solution from which the crystallization takes place. Both $Na_2CO_3.10H_2O$ and $Na_2SO_4.10H_2O$ crystallize in the same system —the monoclinic, and under the microscope the crystal forms of the two compounds are scarcely distinguishable from each other to the eye without accurate measurement of the angles. In other words the two compounds are isomorphous, and according to the laws governing isomorphism it is to be expected that they might form "mixed crystals" or solid solutions of one in the other, as is the case in numberless other examples in the laboratory and in naturally occurring minerals in which the molecules are similarly constituted and which crystallize in the same form. E. Mitscherlich, the classic authority on the phenomena of isomorphism, makes the statement that "while substances of different crystalline form cannot combine in other than fixed proportions, substances of the same crystalline form can crystallize together in all proportions." Further, it is stated by Blasdale in discussing the phenomena of solid solutions that "changes in the degree of hydration of a salt are invariably associated with prominent changes in the crystalline form it assumes as well as in its physical properties including its ability to dissolve other salts. There are no convincing illustrations of solid solutions whose component salts are hydrated but hydrated differently. In general unless the two salts are capable of existing in the same degree of hydration over a similar range of temperatures, and unless the two hydrates possess similar crystallographic properties, a continuous series of solid solutions is not possible." Now it is well known that sodium carbonate heptahydrate crystallizes in a different system to that of the decahydrates of sodium carbonate and sodium sulphate, namely in the rhombic system. While therefore there is no positive statement in the chemical literature that sodium carbonate heptahydrate does not form mixed crystals with sodium sulphate decahydrate, it is seen that according to well established principles governing the phenomena of isomorphism and solid solutions, the heptahydrate could not be expected to form such mixed crystals, and it could therefore be confidently predicted a priori that sodium carbonate heptahydrate would not in fact form such mixed crystals, and this indeed is found to be the case, namely, that sodium carbonate heptahydrate crystallizes out entirely free from sodium sulphate when crystallized from solutions containing both carbonate and sulphate. While it cannot be claimed therefore that this fact of sodium carbonate heptahydrate not forming solid solutions of sodium sulphate decahydrate is in itself a discovery or invention, as it is entirely deducible from generally accepted chemical principles, this present invention uses this fact and consists in determining and outlining the conditions for the largest possible formation of the heptahydrate from Owens Lake brines saturated with sodium chloride according to a simple method highly adaptable to economical commercial operation.

In the patent literature covering crystallization processes for recovering pure sodium carbonate from Owens Lake brines, it has been proposed to first refrigerate the brine to separate out a crop in commercial yield of sodium carbonate decahydrate contaminated with some sodium sulphate in order to separate the sodium carbonate from the sodium chloride of the brine, and then recrystallize this sodium carbonate as the heptahydrate from an aqueous solution containing principally sodium carbonate with some sodium sulphate but practically free from sodium chloride, by means of adjusting the solution as regards its concentration and temperature so that crystallization takes place in the stable range of the heptahydrate. The temperature range within which the heptahydrate is stable in solutions free or nearly free from sodium chloride, is however very small, being from 33° to 30° C. Such a process requires a temperature control both during crystallization and filtering of ±1.5° C., which is a very difficult and delicate one for commercial operation. The necessity for first separating a commercial crop in the form of the decahydrate is stated to be the supposed fact that the direct crystallization of sodium carbonate heptahydrate from Owens Lake brines saturated with sodium chloride is impossible, as, it is stated, the field of this crystalline form disappears entirely in the presence of this high concentration of sodium chloride. This supposition I have found to be entirely erroneous, as will be fully brought out in this specification. Not only is sodium carbonate heptahydrate stable in Owens Lake brines saturated with sodium chloride, but it is stable over a longer range of temperature and concentration than in straight sodium carbonate solutions in the absence of sodium chloride. For instance, the heptahydrate is stable in Owens Lake brines saturated with sodium chloride, from temperatures between 23.6° C. and about 17.5° C., or a range of 6° C. as compared with a range of only 3° C. in the carbonate solutions free from chloride. And what is even more important, and which is the discovery which makes this invention really practical and commercially economical as compared to the previous art, the range of metastable saturation above the transition point of the heptahydrate to the monohydrate, and below the transition point of the heptahydrate to the decahydrate, seems to be enormously greater in saturated solutions of sodium chloride than in the absence of this salt. Full advantage of this discovery is taken in this invention. For example, the concentration of such brines in sodium carbonate and saturated with sodium chloride at the transition point of the heptahydrate to the monohydrate at a temperature of about 23.6° C. is 16.3% $Na_2CO_3$, but in the metastable range of the heptahydrate above this point the sodium carbonate concentration may be run up to as high as 21% $Na_2CO_3$ at a temperature of 31° C. At the other end of the stable heptahydrate field at the transition point of the heptahydrate to the decahydrate at a concenration of around 12.8% $Na_2CO_3$ and a temperature of 17.5° C., the metastable range of the heptahydrate may be run down to as low as 9% $Na_2CO_3$ at a temperature of 10° C. This means that a brine saturated in sodium chloride and containing 21% $Na_2CO_3$ at a temperature of 31° C. may be cooled down to 10° C. with a $Na_2CO_3$ content in the mother liquor of 9%, with a total cooling range of 21° C. as compared to only 3° C. with the straight sodium carbonate solution free from sodium chloride, and with the recovery of a crop of 70% of the original sodium carbonate of the brine in the form of absolutely pure heptahydrate. It is this discovery of the remakable extension possible of the heptahydrate field in the metastable portions of the upper and lower part of the solubtility curve which is the chief feature of this invention, as it makes a process which is highly practical and commercial, and extremely simple to operate.

The above facts will be made clearer by reference to Figures 1 and 2, and an explanation of how they were derived.

Figure 1 is a curve of the solubility of the three hydrates of sodium carbonate in the simple system $Na_2CO_3$—$H_2O$. It is drawn from data taken from a very accurate study of this system available in the literature. The dotted portion of the curves beyond the transition points was the extent to which the curves were followed into the metastable regions in this study.

In Figure 2 are curves of the solubility of the three hydrates in Owens Lake brines saturated or substantially saturated with sodium chloride. By substantially saturated I mean saturated to within two or three per cent of sodium chloride.

In what follows, the terms decahydrate and hetpahydrate unless otherwise specified, relate to sodium carbonate decahydrate, $Na_2CO_3.10H_2O$, and sodium carbonate heptahydrate,

$Na_2CO_3.7H_2O$.

Two varieties of the heptahydrate exist, crystallizing in different forms and with different solubilities. These are known as the alpha and beta forms. The alpha form crystallizes in the rhombohedral system. It is more soluble than the beta variety, is quite unstable even in the solid crystalline form separated from the mother liquor, and has not been encountered in this work. The heptahydrate dealt with here is entirely the beta form, crystallizing in the rhombic system The term monohydrate refers to sodium carbonate monohydrate, $Na_2CO_3.H_2O$.

Some explanation is necessary as to how the curves of Figure 2 were derived, especially the remarkable upper metastable portion of the heptahydrate curve, and this explanation will also serve to elucidate the principles of the invention.

In this study of the crystallization of sodium carbonate from Owens Lake brines, the peculiar fact has been constantly noted and repeatedly checked, that in attempting to obtain the highest concentration of sodium carbonate in such brines in the laboratory, when sodium carbonate monohydrate was used to saturate the brine at around 28° C., the concentration could never be made to exceed about 16% Na₂CO₃. For some time this was thought to be the highest possible concentration of sodium carbonate in such brines, especially as it was observed in the naturally occurring sub-surface brines in the crystal body of Owens Lake (which are always in contact with a large excess of sodium carbonate hydrates in the solid phase), that in the early fall when the temperature of such brine reaches its highest point (26°–27° C.) the concentration of sodium carbonate in solution was never more than about 16.5% Na₂CO₃, the highest concentration of Na₂CO₃ in these brines ever observed being 17%. When however Owens Lake brines were saturated in the laboratory with a slight excess of anhydrous sodium carbonate and the temperature not allowed to go over from 28° to 31° C., brines containing 19% to 21% Na₂CO₃ and completely saturated with sodium chloride were obtained with the greatest ease. Moreover, in making such saturations with anhydrous sodium carbonate, it was observed that the excess sodium carbonate not dissolved was in very definite crystalline form, whereas the original anhydrous sodium carbonate added was amorphous. Examination under the microscope showed definitely that such crystals were those of the heptahydrate. The 21% Na₂CO₃ brine was therefore saturated with the heptahydrate at 31° C., but of course highly supersaturated with respect to monohydrate. The reason therefore such brines are not obtained naturally in the lake is that they are in the metastable field of supersaturation with respect to monohydrate, and in the crystal body of the lake there is an unlimited time element for nuclei and crystals of monohydrate to be formed when the temperature goes too far above the transition point concerned, and so if supersaturation of monohydrate should occur it is soon broken and the solubility falls down to that of the monohydrate at the particular temperature. In the laboratory however these 19% to 21% sodium carbonate brines were found to be very stable, and could be kept unchanged a practically unlimited length of time provided the temperature was kept constant at 28° to 31° C. and monohydrate seed crystals excluded. When cooled a few degrees below 28° C. a plentiful crystallization of the heptahydrate occurred. When warmed a few degrees above 31° C., cloudiness at once resulted and a plentiful precipitation of the monohydrate soon followed. In the crystal body where there is no adequate stirring mechanism for equalization of temperature throughout the mass, local overheating would occur and thus start the precipitation of monohydrate, which would then proceed throughout the mass and equilibrium reached with the monohydrate at the particular temperature.

I do not wish to limit myself by saying that higher saturations of sodium carbonate in a solution containing sodium sulphate and saturated with sodium chloride cannot be obtained at temperatures above 31° C. By very careful work it might be possible to obtain a solution containing more than 21% sodium carbonate and saturated with sodium chloride, but it is obvious that the farther the metastable part of the heptahydrate curve deviates from the solubility curve of the monohydrate, and the higher the temperature, the more unstable such a solution will be, and the more chance there will be of spontaneously forming monohydrate crystals and thus breaking the supersaturation in this constituent. For this reason no attempt was made to prepare stronger solutions of sodium carbonate in such brines, as the increasing instability at the higher temperatures and concentrations involved would render them unsuitable for commercial work, where a certain and known degree of stability is essential.

The heptahydrate solubility curve of Figure 2 throughout its entire length was obtained in the following manner. A naturally occurring Owens Lake brine of approximately the same composition as given on page 1, lines 21 to 33, of U. S. Patent #1,759,361 previously mentioned, was saturated at around 24° C. with an excess of anhydrous sodium carbonate. The heat of hydration causes the temperature to rise to about 28° C. This is complete in about fifteen minutes, after which the temperature is raised to 31° C. and held there for thirty minutes, and then the excess soda filtered off. Such brine contains around 21% Na₂CO₃ and around 12% NaCl, being also saturated with this latter salt. Such brine on cooling only one or two degrees starts to crystallize out heptahydrate, and the cooling was continued down to different temperatures at intervals of 2° C., holding the solution at a constant temperature within ±0.1° C. at each desired temperature for half an hour with constant agitation, and then filtering off a small sample for analysis of the mother liquor with proper precautions for separating the mother liquor from the crystals at the exact temperature desired by having the filter in the main mass of the liquid being held at constant temperature. Consistent results which checked each other very closely were easily obtained. For the lower temperatures it was necessary to remove some of the crystals, as otherwise the mixture got too thick for good temperature equalization. The curve could not be followed much lower than 10° C., as at around this point there was a sharp evolution of heat and the mixture got almost solid due to complete conversion to the decahydrate.

The reason for the ready extension of the heptahydrate curve into the metastable region below the transition point of the heptahydrate to the decahydrate is believed to be as follows: Sodium carbonate decahydrate has a great tendency to form supersaturated solutions. It has been noted that in cooling Owens Lake brines containing from 10% to 13% Na₂CO₃, that unless the solution is seeded with crystals of Na₂CO₃.10H₂O at around a temperature of 18° C., supercooling of from 5° to as much as 9° C. without any crystallization is quite common. It is for this reason that in U. S. Patent #1,759,361 we adopted the practice of always seeding the cooling solution with decahydrate crystals to guard against the sudden crystallization of a large quantity of the decahydrate from a strongly supercooled solution with the resulting formation of fine crystals difficult to filter and wash. With the stronger brines containing 15% to 21% Na₂CO₃, however, a cooling of only one or two degrees below the temperature at which the brine is saturated with Na₂CO₃, always causes crystallization of the heptahydrate to start without seeding of any kind. The heptahydrate, therefore, does not tend to supersaturate in nearly the same degree as the decahydrate. This is quite in accordance with the chemical principle that the more highly hydrated a salt is, and consequently the greater the vapor pressure of H₂O such salt has, the more tendency it has to form supersaturated solutions. Prominent examples of this are borax, $Na_2B_4O_7.10H_2O$, and Glauber's salt, $Na_2SO_4.10H_2O$, which are noted for their strong tendency to form supersaturated solutions. The vapor pressure of $H_2O$ of the heptahydrate being less than that of the decahydrate, it has not the same tendency towards supersaturation. If then a clear brine containing around 12.8% $Na_2CO_3$ at a temperature of 17.5° C., or at the transition point of the heptahydrate to the decahydrate as regards temperature and concentration, is cooled in the absence of seed crystals of either heptahydrate or decahydrate, a considerable amount of supersaturation with respect to decahydrate will occur. For several degrees below the transition temperature of 17.5° C. then such a solution could be supercooled with respect to the decahydrate, until at that particular temperature the composition of the solution came on to the metastable portion of the heptahydrate curve, and if the degree of supersaturation possible for the heptahydrate is small, heptahydrate would crystallize out provided that decahydrate crystals or nuclei had been excluded. Or under such conditions if heptahydrate crystals were already present in the solution at 17.5° C., but not decahydrate crystals, crystallization along the metastable path of the heptahydrate curve would continue. Eventually, however, as the cooling continues, owing to the growing divergence of the decahydrate and the metastable portion of the heptahydrate curve, as shown in Figure 2, the limit of supersaturation with respect to decahydrate would be reached and exceeded, and the solution would enter into the labile field of supersaturation of the decahydrate, where nuclei of $Na_2CO_3.10H_2O$ crystals would spontaneously form. Once decahydrate crystals are formed, the composition of the solution would come down to the decahydrate curve at the particular temperature, the decahydrate being less soluble than the heptahydrate. Also under such conditions on account of the greater solubility of the heptahydrate, all the heptahydrate crystals in the mixture will eventually dissolve and recrystallize out as the decahydrate. These phenomena occur at about 10° C. It is for these reasons, and also for the reason that in previous refrigeration work on these brines the temperatures have for the most part been carried down below 10° C. and down to 5° C., that the heptahydrate phenomena have been entirely missed by workers in this field.

The curve for the decahydrate solubility was obtained by taking a 16% $Na_2CO_3$ brine, saturated of course with sodium chloride, cooling this down to about 10° C. to crystallize out heptahydrate, and then cooling further to 5° C., when the crystals changed over completely to the decahydrate. A sharp evolution of heat was noted when cooling below 10° C. This is caused by the fact that the heat of crystallization of the heptahydrate is less than that of the decahydrate. In converting the entire mass of already formed heptahydrate to decahydrate, therefore, a considerable amount of heat is evolved. This mixture at 5° C. containing entirely decahydrate crystals and mother liquor, was now gradually warmed up, and samples filtered for analysis at intervals of 2.5° C. with the proper precautions of filtering at the exact temperature of the solution. When the solubility curve of the decahydrate so determined cuts the heptahydrate curve, or in other words when the solubility of the decahydrate is exactly the same as that of the heptahydrate, that is the transition point of the two salts in this particular brine. It was observed that at temperatures above this transition point, the excess of sodium carbonate decahydrate crystals in suspension was changed to the heptahydrate, and the metastable part of the decahydrate curve above the transition point could not be followed. The reason for this is the narrow field of metastable supersaturation of the heptahydrate, as previously explained. Also in brine above 12.8% $Na_2CO_3$ and 17.5° C. in temperature, if an excess of decahydrate crystals is added, and also enough solid sodium chloride to maintain saturation in this constituent, there is an almost immediate conversion of the whole mass of decahydrate to heptahydrate. This fact may be utilized in purifying sodium carbonate decahydrate contaminated with sodium sulphate by providing the proper conditions for this conversion to heptahydrate to take place, as will be seen in the example given later.

The monohydrate solubility curve was determined by taking a brine containing 19% to 21% $Na_2CO_3$ and saturated with sodium chloride, prepared as described at 31° C., and warming slightly to 40° C., when there is a plentiful precipitation of the monohydrate. This mixture containing monohydrate in excess in the solid phase, was then cooled to lower temperatures at intervals of 2° C., and samples of mother liquor filtered off and analyzed.

Having fully described the principles underlying my invention, I will now describe and give examples of how it may be carried out in commercial operation. Before doing this, however, it will be necessary to briefly describe the present condition of the crystal body of Owens Lake.

Before the city of Los Angeles diverted the water of Owens River from Owens Lake, the lake had a depth of water or dilute brine of about 30 feet. The contained salts were then in complete solution, no crystallization of any salts having then occurred. In 1912 this dilute brine, according to the most trustworthy published analysis of the Geological Survey Laboratory in Washington, had the following composition:

| | |
|---|---|
| Specific gravity | 1.098 |
| $Na_2CO_3$ per cent | 4.29 |
| NaCl do | 3.96 |
| KCl do | .44 |
| $Na_2SO_4$ do | 1.61 |
| $Na_2B_4O_7$ do | .27 |
| $Na_2SiO_3$ do | .05 |

It will be seen that sodium carbonate is the largest single constituent. Since the diversion of the main source of fresh water into this lake in 1917, the brine body has dried down to its present condition, which in the crystal body proper is that of a crystal mass or skeleton 8 to 10 feet deep at its deepest part and permeated with saturated brine. Very careful studies made of the crystal body in a section 8 feet deep of the composition of the crystal mass at different depths, have shown the following composition, expressed in water free salts.

| | NaCl | $Na_2CO_3$ | $Na_2SO_4$ |
|---|---|---|---|
| | Percent | Percent | Percent |
| Upper 2½ feet | 80 | 10 | 5 |
| Next 1½ feet | 60 | 15 | 25 |
| Next 1 foot | 35 | 25 | 40 |
| Lower 3 feet | 5 | 90 | 5 |

At about 30 inches below the surface of the crystal body there is a hard salt layer a few inches thick. Above this layer the brines and salts are designated "surface;" below this, "sub-surface" brines and salts. The chief characteristic of the surface part of the crystal body is the high percentage of sodium chloride and the large fluctuations of temperature, exposed as it is to the wide variations in atmospheric temperature throughout the year. However in the Owens Lake region, with its elevation of 3550 feet above sea level, there is more cold weather than warm throughout the year, the really hot weather only lasting two or three months in July, August, and September. As a consequence of this, and also from the fact that the sub-surface part is more or less protected from the temperature fluctuations of the surface, the temperature of the sub-surface part does not vary so widely. From prolonged records it is known that the temperature of the sub-surface brines varies from 14° C. at their lowest in March or April, to a peak of 27° C. in September. There is no doubt therefore that the sodium carbonate in the sub-surface salts remains in the more highly hydrated forms of the decahydrate or heptahydrate throughout the greater part of the year, and only in the months of July, August, and September, is there likelihood of any conversion to the monohydrate. It must also be taken into account in this connection that the large mass of highly hydrated sodium carbonate and sodium sulphate, which persists from the colder weather, serves as a balance wheel or equalizer of temperature changes, as in dissolving these hydrates large quantities of heat are absorbed, which tends to hold the temperature down. It is necessary to bring these facts out, as they play an important part in carrying out this invention.

Preferably the commercial plant would be located on the shore at the nearest point to the deepest part of the crystal body, in order to have the shortest possible pipe line for pumping a mixture of brine and salts. The deepest part of the crystal body is not in the center of the lake, as the bottom contour lines crowd toward the western shore, the "sink" of the lake being located only two miles from the western shore. By suitable mechanical means a mixture of brine and salts would be pumped through this relatively short pipe line, preferably from a level four feet or greater from the surface of the lake in order to secure as high a percentage of sodium carbonate salts as possible, although even the surface salts contain a sufficient quantity of sodium carbonate crystals for the purpose but more of them would have to be used. This mixture would be pumped to the plant, well stirred in a vessel provided with a suitable agitator, and supplied with both warming and cooling coils to hold the temperature at about 28° C. to 31° C. If there is a sufficient excess of sodium carbonate decahydrate or heptahydrate present in the salts, saturation up to 19% to 21% $Na_2CO^3$ will occur in thirty minutes, or an even shorter time. There will always be a large enough excess of solid sodium chloride in the salts to maintain saturation in this constituent, as the brine in contact with the crystals as pumped is already saturated with sodium chloride. The contents of the vessel are then allowed to settle at the temperature of 28° C. to 31° C., and the clear brine drawn off, or if desirable the whole mass may be filtered over a rotary or other filter. In hot weather should the salts pumped contain monohydrate, the brine will only saturate up to around 16% $Na_2CO_3$. Several alternatives are possible in this rather unlikely contingency. No further attempt may be made to prepare a stronger brine, but such 16% $Na_2CO_3$ brine may be cooled down to say 12° C. with strict precautions against undercooling, so that there is no danger of going over to the decahydrate, and a recovery of 50% of the sodium carbonate originally in the brine obtained as pure heptahydrate. I have found that brines as low as 15% to 16% $Na_2CO_3$ if cooled carefully at the start will crystallize out the heptahydrate without the necessity of seeding with heptahydrate crystals. Or the mass of salts and brine may be agitated a sufficient length of time at a temperature below the transition point of the monohydrate to heptahydrate and the monohydrate of the salts thus be converted to heptahydrate, when the temperature may be raised to 28° to 31° C. and the 19% to 21% $Na_2CO_3$ saturation obtained. Or finally saturation with the monohydrate containing salts may be obtained up to 16% $Na_2CO_3$, the brine separated from the salts, and then a sufficient portion of the separated or fresh salts dried so that the monohydrate is converted to anhydrous sodium carbonate, and the 16% $Na_2CO_3$ brine treated with a sufficient quantity of the dried salts to obtain the 19% to 21% saturation in sodium carbonate.

Such a prepared brine may have approximately the following composition:

| | |
|---|---|
| Specific gravity | 1.369 |
| $Na_2CO_3$ Per cent | 20.9 |
| $Na_2B_4O_7$ do | 2.4 |
| $Na_2SO_4$ do | 3.4 |
| NaCl equivalent do | 12.2 |
| Water and other constituents do | 61.1 |
| Total | 100.0 |

By NaCl equivalent is meant the total chlorine of the brine calculated to sodium chloride. It is to be understood that the brine contains some 2% or 3% of KCl, which is thus included in the NaCl equivalent.

1,582 gallons of this prepared brine is cooled from a temperature of 31° C. to 16° C. with good agitation and temperature equalization throughout the liquid to avoid local undercooling, thereby crystallizing out 4,732 pounds of pure $Na_2CO_3.7H_2O$, containing 2,162 pounds of $Na_2CO_3$, suspended in 13,255 pounds of mother liquor of approximately the following composition.

| | Per cent |
|---|---|
| $Na_2CO_3$ | 12.0 |
| $Na_2B_2O_4$ | 3.2 |
| $Na_2SO_4$ | 4.6 |
| NaCl equiv | 16.4 |

The heptahydrate crystals are separated from the mother liquor by suitable mechanical means, preferably by centrifuging as permitting a more positive separation of mother liquor and a more effective washing, and the crystals washed with water until as free as practicable from adhering mother liquor impurities. There will be obtained crystals containing 2,000 pounds of pure sodium carbonate. The heptahydrate crystals are then dried in a suitable dryer to produce 2,000 pounds of soda ash having approximately the following composition:

| | Per cent |
|---|---|
| $Na_2CO_3$ | 99.25 |
| $Na_2B_2O_4$ | .10 |
| $Na_2SO_4$ | .15 |
| NaCl | .50 |
| Total | 100.00 |

The invention may also be applied, but with a smaller recovery of sodium carbonate, to naturally occurring brines less strongly concentrated in sodium carbonate, say from 16% down to 13% $Na_2CO_3$, or perhaps lower. For brines under 15% $Na_2CO_3$ it might be necessary to seed the cooling solution with crystals of the heptahydrate. Such crystals for seeding may be made with the greatest ease in any desired quantity by adding anhydrous sodium carbonate to a 12% solution of sodium chloride, or to any Owens Lake or similar brine substantially saturated with sodium chloride. The sodium carbonate would be added under such conditions as would prevent the heat of hydration from carrying the temperature of the solution over 31° C. Under these conditions all the excess of $Na_2CO_3$ over that dissolved to increase the saturation of the mother liquor to 21% $Na_2CO_3$ would crystallize out as $Na_2CO_3.7H_2O$. Or a lower temperature may be used for the saturation down to 18° C. with a lower percentage of sodium carbonate remaining in the mother liquor. In this manner as large a crop of heptahydrate crystals as desired may be very easily prepared and filtered off for use, or a suspension of the crystals in the mother liquor may be used for the purpose of seeding without filtering them off. After such seeding the brine could be cooled down to 12° C. and still crystallize out only the heptahydrate, but the danger of going over to the decahydrate would be greater unless very careful cooling with strict avoidance of local undercooling was practiced, as one would then be working in the metastable field of the heptahydrate. Vacuum cooling, by which the brine would be cooled to the desired temperature by boiling it under a high vacuum and the cooling accomplished by the latent heat of evaporation of water, is ideally suited for this operation, as it automatically avoids any undercooled surfaces through which heat is being abstracted with a large temperature difference, as with vacuum cooling the temperature cannot go lower than the boiling point of the solution under the vacuum employed.

Any low grade salts containing a sufficient quantity of sodium carbonate either as the decahydrate, heptahydrate, or preferably as anhydrous sodium carbonate, may be used for preparing a brine containing sufficient concentration of $Na_2CO_3$ to crystallize out only heptahydrate on cooling. Such low grade salts ideally suited for this purpose are trona deposits of Owens Lake. These are chemically the sesquicarbonate of soda, $Na_2CO_3.NaHCO_3.2H_2O$, of which there are large deposits on the marginal portions of Owens Lake. In parts of the lake they are sufficiently uncontaminated with sand or mud to be harvested cheaply and dried by a cheap source of heat, such as waste heat, to an anhydrous condition. Such a material may have the following composition:

|  | Per cent |
|---|---|
| $Na_2CO_3$ | 64.4 |
| $Na_2B_2O_4$ | 1.4 |
| $Na_2SO_4$ | 6.3 |
| NaCl | 15.3 |
| Sand and foreign matter | 12.6 |
| Total | 100.0 |

A slight excess of the calcined trona over the amount necessary to bring the content of the brine to 21% $Na_2CO_3$ is added to any brine substantially saturated with sodium chloride at a temperature sufficiently low that the heat of hydration will not carry the final temperature over 31° C., and the temperature maintained at 28° to 31° C. for a short time, with agitation, the clear brine decanted or filtered off, and then cooled as previously directed to crystallize out the heptahydrate. It is obvious also that it is not necessary to use Owens Lake brine. Cheap sodium chloride could be used for preparing a brine containing slightly less than 12% NaCl, and the calcined trona added to this.

Also an impure soda ash containing sulphate and even large quantities of sodium chloride may be used as the saturating material.

Another low grade sodium carbonate containing material available at certain times of the year for this invention is the product known to operators on Owens Lake as "winter soda." This is a crude decahydrate of sodium carbonate, which is crystallized out in large quantities when a surface or sub-surface brine containing over 9% $Na_2CO_3$ is stored in a relatively shallow vat or pond, and subjected to atmospheric cooling in the winter time. Under such conditions more than 50% of the contained sodium carbonate of the brine may be crystallized out as a crude decahydrate, when the mother liquor may be pumped or drained out of the vat, and the crude decahydrate harvested and transported to the plant. The crude solid decahydrate crystals may be used as such as the saturating material, together with enough solid sodium chloride to maintain saturation in NaCl, or the crude decahydrate may be melted in the plant by warming up to its melting point, and the resulting liquor filtered or allowed to thoroughly settle in order to separate any monohydrate crystals that might have been formed in the heating and melting operation. This clear liquified crude decahydrate is now added to a surface or sub-surface brine in quantities sufficient or in slight excess to bring the concentration of the resulting brine up to 21% $Na_2CO_3$, while at the same time a sufficient amount of solid sodium chloride is added with agitation to maintain saturation of the brine in NaCl, while the temperature of the mixture is maintained at 28° to 31° C. The excess sodium carbonate crystallizing out and the excess of sodium chloride above that necessary for saturation, may be settled or filtered off, and the 19% to 21% $Na_2CO_3$ brine cooled to crystallize out a commercial crop of pure heptahydrate as previously described.

The invention may also be applied to another low grade sodium carbonate containing material. When Owens Lake brine or brine of similar composition is evaporated to recover potash, large quantities of waste salts are obtained containing a considerable amount of free sodium carbonate. By free sodium carbonate is meant that not combined with sodium sulphate as in the double salt $Na_2CO_3.2Na_2SO_4$ known as burkeite. Such salts may have the following average composition:

|  | Per cent |
|---|---|
| $Na_2CO_3.H_2O$ | 7.3 |
| $Na_2CO_3.2Na_2SO_4$ | 33.3 |
| NaCl | 48.0 |
| Moisture | 11.4 |
| Total | 100.0 |

In recovering 100 tons of potassium chloride from such brines, there may be obtained as much as 50 tons of sodium carbonate in the form of monohydrate in such salts, which may be recovered in a pure state by this invention. To 1000 parts of salts of the above composition would be added 150 parts of water and the mixture stirred at 31° C., which would extract practically all of the sodium carbonate monohydrate in 390 parts of a solution of approximately the composition:

|  | Per cent |
|---|---|
| $Na_2CO_3$ | 16.0 |
| $Na_2SO_4$ | 2.3 |
| NaCl | 13.5 |
| Water | 67.7 |
| Total | 100.0 | as in the example given in U. S. Patent #1,853,275. 1000 parts of fresh salts would be dried to convert the monohydrate to anhydrous sodium carbonate, and added to the 390 parts of the brine containing 16% $Na_2CO_3$ and agitated at a temperature not to exceed 28° to 31° C. There would thereby be formed 450 parts of a 19% to 21% $Na_2CO_3$ brine saturated with sodium chloride and low in sodium sulphate, which would be cooled to form only pure heptahydrate. The mother liquor from the heptahydrate filtrate could be used for re-saturation in sodium carbonate.

Also sodium carbonate decahydrate contaminated with a small amount of sodium sulphate, such as the product obtained in U. S. Patents #1,759,361 and #1,853,275, may be purified through the heptahydrate much more economically than previously proposed, by taking advantage of the fact that above the transition point of the decahydrate to heptahydrate in solutions saturated with sodium chloride, decahydrate crystals in suspension go over to the heptahydrate, and the sodium sulphate in solid solution in the decahydrate crystals is thus liberated to the mother liquor. For instance a sufficient quantity of either a natural lake brine or an artificially prepared brine of just sodium chloride, is taken, so that the final mixture of solution and suspended crystals will not be too thick to handle and filter easily. Such brine may contain 13% $Na_2CO_3$ or lower, and about 14% NaCl, being saturated with these constituents at about 18° C. To this brine is added an excess of decahydrate crystals of approximately the following composition:

|  | Per cent |
|---|---|
| $Na_2CO_3.10H_2O$ | 90.0 |
| $Na_2SO_4.10H_2O$ | 4.2 |
| Moisture and other constituents | 5.8 |
| Total | 100.0 |

Also it will be necessary to add a sufficient amount of solid sodium chloride to maintain substantial saturation in sodium chloride, but not to exceed this, as three molecules of water will be given up to the mother liquor by the decahydrate and ten molecules of water from the Glauber's salt when the $Na_2CO_3.7H_2O$ is formed, and also water will be added by the moisture present, and all this water must be substantially saturated with sodium chloride. There will be an absorption of heat due to the difference of the heats of crystallization of the decahydrate and heptahydrate, so it will be necessary to warm the solution up to 18° C. or slightly over. This temperature is maintained with thorough stirring until all the decahydrate has gone into solution and recrystallized out as the heptahydrate, when all the sodium carbonate in suspension will be in the form of pure heptahydrate free from sodium sulphate. This may be filtered off, washed practically free from mother liquor, and dried as usual to pure anhydrous sodium carbonate. The mother liquor will still be saturated with sodium chloride, or nearly so, if sufficient solid NaCl has been added, and will still contain only 13% $Na_2CO_3$, and the recovery of the sodium carbonate of the decahydrate crystals as pure heptahydrate should be fully 90%.

Obviously also the method may be applied to a brine containing sodium carbonate, some sodium sulphate, but little or no sodium chloride, by saturating such brine with solid NaCl at a temperature around 31° C. If a high concentration of sodium carbonate is present, the excess over and above the 21% $Na_2CO_3$ remaining in the mother liquor will crystallize out as pure heptahydrate. The solution containing the suspended heptahydrate may be cooled to 18° C. and a still larger crop of pure heptahydrate obtained. If the brine is too low in sodium carbonate for the above procedure, it may be concentrated by evaporation to such a point as will allow the above procedure to be adopted if the sodium sulphate is low enough so that the sodium sulphate content of the final mother liquor after crystallizing out the heptahydrate does not exceed 6% $Na_2SO_4$, at which point there would be danger of precipitating $Na_2SO_4.10H_2O$ as such with the heptahydrate. If the ratio of sodium sulphate to sodium carbonate in the original solution is high enough so that more than about 6% $Na_2SO_4$ would be formed in the final mother liquor, the sodium sulphate of the original brine may be reduced to a permissible figure according to the principles of U. S. Patent #1,853,275, and then the above procedure applied to obtain a pure heptahydrate.

I do not wish to limit myself entirely to the above examples. Various combinations are possible in which the above principles may be applied to particular conditions or to particular materials using the principles outlined by those skilled in the art.

The advantages of this invention over those previously proposed are many, and I will briefly enumerate some of them.

1. It is very simple and highly adapted to easy and economical commercial operation, involving as it does one saturation at a moderate temperature, only one filtering and washing operation instead of two as in previous inventions, and a final comparatively low temperature drying operation. The expense of extra filters for monohydrate is thus eliminated, and the investment cost of a plant correspondingly lowered. Also the labor for operating the monohydrate filter is eliminated.

2. It is very economical in expenditure of thermal energy for either heating or cooling. The cooling range being within the scope of ordinary cooling water for the greater part of the year, it avoids the necessity of artificial refrigeration, such as ammonia compressor or other refrigerating machinery, as is necessary in other crystallizing processes on these brines. This makes a very considerable saving in investment cost of the plant, and also of labor charge for running such machinery. Also the heat of crystallization of the heptahydrate is considerably less than that of the decahydrate, being 192.5 B. t. u. per pound of sodium carbonate crystallized as the heptahydrate as compared with 273.3 B. t. u. per pound of sodium carbonate crystallized as the decahydrate. Also there is no heat of crystallization of sodium sulphate decahydrate such as occurs to a small extent in the decahydrate process.

3. It avoids the use of evaporators for forming the monohydrate as in previous crystallization processes, thus saving in heat consumption for heating and evaporating the sodium carbonate solution. The heptahydrate may be dried directly first to monohydrate, and finally to anhydrous sodium carbonate, in the same dryer. The heptahydrate in crystal form readily parts with its water of crystallization down to the monohydrate. In the dryer a considerable portion of the heat supplied for converting monohydrate to anhydrous carbonate in the heated end of the dryer would be carried back to the part where the heptahydrate would be fed, and six molecules of water of the heptahydrate driven off by this mild heat, and the monohydrate progressed forward to the heated end of the dryer to be converted to anhydrous sodium carbonate. Thus the heptahydrate would be dried practically by waste heat to the monohydrate instead of consuming steam for heating a solution and evaporating off water. Another considerable saving in thermal energy is that in the decahydrate process the decahydrate must be melted before being fed to the evaporator. Theoretically the melting absorbs exactly the same amount of heat as was given off in its crystallization. The thermal energy therefore required to take care of the heat of crystallization in forming the decahydrate from a solution is exactly doubled by the necessity of having to melt it again. This double absorption of thermal energy is avoided in the heptahydrate process, as the heptahydrate is not melted, but fed directly to the dryer, where the water of crystallization is driven off preferably while the sodium carbonate is all in the solid state. The elimination of evaporators or making provision for melting the decahydrate also reduces the investment cost of the plant and labor cost for operating same.

4. There is no silica problem in this invention. In previous crystallization processes for Owens Lake brine, the crystallization of the decahydrate carried the alkalinity of the mother liquor below the point where the silica was held in solution, and sufficient quantities of silica separated out to seriously contaminate the final product. This was prevented in U. S. Patent #1,759,361 by maintaining the alkalinity of the mother liquor by the addition of caustic soda. In the heptahydrate process the alkalinity of the mother liquor, owing to its higher sodium carbonate content, does not go below the point where silica starts to separate out. The silica problem therefore does not appear in this process.

5. Finally, a soda ash of light apparent density is produced directly by this process. When monohydrate is crystallized from a solution and dried to anhydrous sodium carbonate, it results in a so-called dense soda ash, of an apparent density of about 60 pounds to the cubic foot. While this is advantageous for certain uses, such as glass making, a certain proportion of the soda ash trade requires a lighter ash of density around 30 pounds to the cubic foot. In the ammonia soda process the product of the calcination of the sodium bicarbonate naturally results in a so-called light ash, and the dense ash requirement of the trade is made from light ash by either incipient or complete fusion of the sodium carbonate, and grinding the product, or by adding water to the light ash in the approximate proportions to form the monohydrate, and drying this monohydrate to a dense ash. The problem, however, of making a true light ash from a dense ash, which appears in all crystallization processes to the present from this or similar brines, has so far not been satisfactorily solved. The problem is solved in this invention if certain conditions are observed. The apparent density of soda ash is a function largely of particle size. Monohydrate crystallized from solutions has a fairly large, compact crystal, with the result that when its water is driven off, the particles of soda ash are still sufficiently large and compact to give a true dense ash. If finely ground to pass a 400 mesh screen, dense ash can be made into light ash. The expense of this additional operation, however, is to be avoided if possible. When, however, either the heptahydrate or the decahydrate is allowed to lose its water of crystallization under conditions that no actual melting of the hydrate takes place, or in other words when it undergoes a true efflorescence, the resulting crystals of monohydrate are extremely minute, passing a 400 mesh screen. When such monohydrate is finally dried to the anhydrous form, the resulting soda ash is a true light ash. In this invention full advantage may be taken of this fact without any extra operation or expense. All that suffices is to see that the heptahydrate is first exposed to very gentle temperatures insufficient to melt same or to cause fritting, partial melting, or any solution in water, until a large proportion of the water is driven off. As the vapor tension of water of the heptahydrate is greater than the normal vapor tension of water in the atmosphere, especially in the desert region of Owens Lake, where the average humidity is very low, a current of relatively dry warm air or gases would effect this operation without any actual melting of the heptahydrate. In this manner a true light ash of as low a density as 25 pounds to the cubic foot can be obtained. This is not possible in the invention of U. S. Patent #1,853,275 without extra expense, as although the decahydrate effloresces as easily or even more readily than the heptahydrate and would thus produce a light ash if dried in this manner, the decahydrate is not pure sodium carbonate, and if dried directly without further purification would not produce a 58% $Na_2O$ commercially pure soda ash.

Dense ash can be made from the light ash in the same manner as in the ammonia soda industry. Or if desired a dense ash may be made directly by melting up the heptahydrate or dissolving it in a small amount of water, and then evaporating this sodium carbonate solution to crystallize out the monohydrate, filtering and washing this monohydrate, and drying same directly to produce a dense ash.

What I claim is:

1. The method of crystallizing pure sodium carbonate heptahydrate consisting in the preparation of a solution by dissolving to saturation a crude, solid sodium carbonate in a brine saturated with respect to sodium chloride and containing less than five per cent. sodium sulphate at a temperature between 28° C. and 31° C., cooling said solution without any undercooling to a temperature not lower than 10° C. to crystallize sodium carbonate heptahydrate from said solution and then separating out the crystalline material so obtained.

2. The method of crystallizing pure sodium carbonate heptahydrate consisting in the preparation of a solution by dissolving to saturation a crude, solid sodium carbonate in a brine saturated with respect to sodium chloride and containing less than five per cent. sodium sulphate at a temperature between 28° C. and 31° C., cooling said solution to a temperature not lower than 10° C. under conditions of agitation and temperature control which will avoid any undercooling to crystallize only sodium carbonate heptahydrate from said solution and then separating out the crystalline material so obtained.

3. The method of crystallizing pure sodium carbonate heptahydrate from a sodium carbonate brine containing sodium chloride and also sodium sulphate in an amount such that the concentration of sodium sulphate in the final heptahydrate mother liquor will be less than 6%, which consists in agitating the brine having substantially the composition of an Owens Lake brine with a mixture of salts containing an excess of the solid phases of sodium chloride and any form of sodium carbonate except sodium carbonate monohydrate, while warming the mixture to a temperature not to exceed 31° centigrade, whereby the prepared brine contains from 16½% to 21% of sodium carbonate and is supersaturated with respect to sodium carbonate monohydrate, removing undissolved matter from the brine, and cooling the clear brine from said solution temperature to a temperature above 10° centigrade under conditions of agitation and no local undercooling, thereby crystallizing out of the brine from 50% to 70% of its sodium carbonate content in the form of pure heptahydrate crystals free from crystallized sodium sulphate and all other crystallized impurities.

4. The method of crystallizing pure sodium carbonate heptahydrate from brines substantially saturated with sodium chloride and containing from 13% to 16½% of sodium carbonate and an amount of sodium sulphate such that the concentration of this constituent in the final mother liquor shall be less than 6%, which consists in first cooling such brines to a temperature between 18° and 24° centigrade, then seeding such brines with crystals of sodium carbonate heptahydrate and continuing the cooling to a temperature about 10° centigrade under conditions of agitation and temperature equalization which avoid undercooling anywhere throughout the mixture in order to prevent the formation of sodium carbonate decahydrate and to crystallize out only pure sodium carbonate heptahydrate free from crystallized sodium sulphate and any other crystallized impurities in a yield of from 40% to 50% of the sodium carbonate in the brine.

5. A method of obtaining a high yield of pure sodium carbonate from crude sodium carbonate decahydrate crystals, which comprises melting such crystals, separating undissolved matter from the liquor thus formed, adding a sufficient quantity of the clear liquor to an Owens Lake brine which is maintained at a temperature of from 28° to 31° C. to bring the sodium carbonate concentration in the brine to approximately 21%, the mixed brine also being maintained saturated with sodium chloride, separating undissolved matter from the mixed brine, and cooling the resultant brine from the solution temperature to a temperature above 10° C., with careful avoidance of local under-cooling, to crystallize out of the solution pure crystals of sodium carbonate heptahydrate.

ALEXIS C. HOUGHTON.